United States Patent
Winkler et al.

(10) Patent No.: US 9,625,043 B2
(45) Date of Patent: Apr. 18, 2017

(54) APPARATUS TO BIAS SPOOL VALVES USING SUPPLY PRESSURE

(71) Applicant: FISHER CONTROLS INTERNATIONAL LLC, Marshalltown, IA (US)

(72) Inventors: Richard Jay Winkler, Marshalltown, IA (US); Christopher Steven Metschke, Ames, IA (US); Bradley Dale Busse, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 273 days.

(21) Appl. No.: 14/075,804

(22) Filed: Nov. 8, 2013

(65) Prior Publication Data
US 2015/0129070 A1    May 14, 2015

(51) Int. Cl.
| | |
|---|---|
| *F16K 11/07* | (2006.01) |
| *F16K 31/12* | (2006.01) |
| *F15B 13/04* | (2006.01) |
| *F16K 31/122* | (2006.01) |
| *F16K 31/124* | (2006.01) |

(Continued)

(52) U.S. Cl.
CPC ........ *F16K 11/0716* (2013.01); *F15B 13/042* (2013.01); *F15B 13/0402* (2013.01); *F16K 11/07* (2013.01); *F16K 31/12* (2013.01); *F16K 31/128* (2013.01); *F16K 31/1221* (2013.01); *F16K 31/1245* (2013.01); *F16K 31/1262* (2013.01); *F15B 2211/323* (2013.01);
(Continued)

(58) Field of Classification Search
CPC .................................................... F13B 13/043

USPC ........................................ 137/625.67–625.69
See application file for complete search history.

(56) References Cited

U.S. PATENT DOCUMENTS

| | | | |
|---|---|---|---|
| 3,536,085 A | 10/1970 | Taplin | |
| 3,596,560 A * | 8/1971 | Butterworth | ........................ 91/6 |

(Continued)

FOREIGN PATENT DOCUMENTS

| | | |
|---|---|---|
| DE | 102012005776 | 10/2012 |
| JP | S5861381 | 4/1983 |
| JP | 2002188751 | 7/2002 |

OTHER PUBLICATIONS

Fisher Controls International, Inc., "FIELDVUE DVC5000 Series Digital Valve Controller," Bulletin 62.1 DVC5000, Jan. 2001, 10 pages.

(Continued)

*Primary Examiner* — Kevin Murphy
*Assistant Examiner* — Daniel P Donegan
(74) *Attorney, Agent, or Firm* — Hanley, Flight & Zimmerman, LLC

(57) ABSTRACT

Methods and apparatus to bias spool valves using supply pressure are disclosed. An example apparatus includes a housing of a spool valve, the housing including a first port to receive a fluid at a supply pressure. The example apparatus further includes a spool within the housing. A position of the spool is to be selectively controlled via an input force acting on the spool, the position of the spool to define a path of a flow of the fluid through the spool valve from the first port to a second port of the housing. A biasing force is to bias the spool opposite the input force, the biasing force to be generated from the supply pressure applied to an end of the spool.

20 Claims, 6 Drawing Sheets

(51) Int. Cl.
*F16K 31/126* (2006.01)
*F16K 31/128* (2006.01)
*F15B 13/042* (2006.01)

(52) U.S. Cl.
CPC .. *F15B 2211/329* (2013.01); *Y10T 137/86614* (2015.04); *Y10T 137/86694* (2015.04)

(56) References Cited

U.S. PATENT DOCUMENTS

| | | | | |
|---|---|---|---|---|
| 4,014,509 | A * | 3/1977 | Yoshino | F15B 13/0433 137/625.61 |
| 4,655,378 | A | 4/1987 | DuFour | |
| 4,889,161 | A | 12/1989 | Janecke | |
| 4,911,036 | A | 3/1990 | Ueki et al. | |
| 5,597,015 | A * | 1/1997 | Asou | 137/625.64 |
| 7,104,283 | B2 * | 9/2006 | Ino | 137/625.65 |
| 2002/0007857 | A1 * | 1/2002 | Lou | F16K 31/0613 137/625.65 |
| 2003/0208305 | A1 * | 11/2003 | Junk | F15B 13/0402 700/282 |
| 2004/0154672 | A1 * | 8/2004 | Liberfarb | G05D 7/005 137/625.64 |
| 2005/0236595 | A1 * | 10/2005 | Miyazoe | 251/129.09 |
| 2006/0260702 | A1 * | 11/2006 | Levesque | F16K 37/0091 137/803 |
| 2008/0163937 | A1 * | 7/2008 | Esposito | F16K 37/0091 137/487.5 |
| 2010/0057262 | A1 * | 3/2010 | Boger | G05B 15/02 700/282 |
| 2012/0216898 | A1 * | 8/2012 | Carter | F15B 11/068 137/861 |
| 2012/0247594 | A1 * | 10/2012 | Inagaki | 137/625.69 |
| 2012/0255617 | A1 | 10/2012 | Miyazoe et al. | |
| 2015/0129070 | A1 * | 5/2015 | Winkler | 137/625.64 |

OTHER PUBLICATIONS

Emerson Process Management, "FIELDVUE DVC6000 Series Digital Valve Controllers," Product Bulletin 62.1 DVC6000, Sep. 2003, 12 pages.
Metso Automatic, Inc., "Neles Valvguard VG9000 Intelligent Safety Solenoid," Technical Bulletin, Sep. 2013, 12 pages.
International Searching Authority, "Search Report", issued in connection with PCT patent application No. PCT/US2014/064464, mailed on Mar. 10, 2015, 5 pages.
International Searching Authority, "Written opinion", issued in connection with PCT patent application No. PCT/US2014/064464, mailed on Mar. 10, 2015, 6 pages.
International Searching Authority, "International Preliminary Report on Patentability", issued in connection with PCT patent application No. PCT/US2014/064464, mailed on May 10, 2016, 8 pages.

\* cited by examiner

APPARATUS TO BIAS SPOOL VALVES USING SUPPLY PRESSURE

FIELD OF THE DISCLOSURE

This disclosure relates generally to spool valves and, more particularly, to methods and apparatus to bias spool valves using supply pressure.

BACKGROUND

Spool valves are a common component in many hydraulic and/or pneumatic machines and systems. Spool valves are used to control and/or direct the flow of fluid along different paths between one or more input ports of the spool valve to one or more output ports based upon the position of a spool within the spool valve.

SUMMARY

Methods and apparatus to bias spool valves using supply pressure are disclosed. An example apparatus includes a housing of a spool valve, the housing including a first port to receive a fluid at a supply pressure. The example apparatus further includes a spool within the housing. A position of the spool is to be selectively controlled via an input force acting on the spool, the position of the spool to define a path of a flow of the fluid through the spool valve from the first port to a second port of the housing. A biasing force is to bias the spool opposite the input force, the biasing force to be generated from the supply pressure applied to an end of the spool.

Another disclosed example apparatus includes a spool within a spool valve to control a flow of fluid at a supply pressure through the spool valve as the spool is moved via an input force. The spool valve is to define a chamber adjacent an end of the spool. A biasing force is to bias the spool opposite the input force, the biasing force to be generated from a biasing pressure of the fluid within the chamber. The biasing pressure is to be based on the supply pressure.

Another disclosed example apparatus includes a spool within a spool valve, the spool to be selectively moveable within the spool valve via an input force to control a flow of a supply fluid between ports in the spool valve, the supply fluid having a supply pressure. The example apparatus further including means for generating a biasing force to bias the spool opposite the input force, the biasing force corresponding to a biasing pressure applied to an end of the spool. The biasing pressure to be based on the supply pressure of the supply fluid.

DETAILED DESCRIPTION

Figure 1:
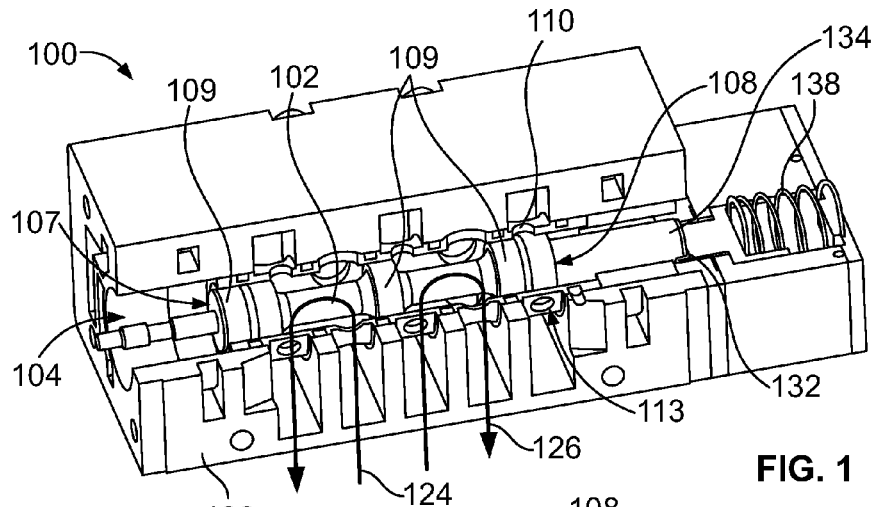
FIGS. 1-3 are cut-away perspective views of an example spool valve constructed in accordance with the teachings disclosed herein with the spool in different positions.

Many known spool valves are controlled by an input force that urges a spool within the valve in one direction and that is counteracted by a biasing force to bias the spool in the opposite direction. In such known spool valves the biasing force is generally fixed such that by varying the input force, relative to the biasing force, the position of the spool within the spool valve can be precisely controlled. In many known spool valves, the input force is produced by an input pressure applied to an end of the spool where the input pressure corresponds to a proportion of a supply pressure of a fluid being directed through the spool valve. Such spool valves are used in many different applications associated with a wide range of supply pressures. Accordingly, the range of the corresponding input pressures of such spool valves also varies widely between different applications.

For spool valves to function properly, the spool valve employs a constant biasing force of suitable strength relative to the input force to keep operating range of the spool valve centered within the operating range of the input force. Therefore, the biasing force needed to operate a spool valve in any particular application depends upon the supply pressure used in the application.

Unfortunately, many known spool valves have a fixed biasing force designed for a particular supply pressure and/or narrow range of supply pressures. Accordingly, to satisfy the demand for spool valves to be used in different applications associated with wide ranging pressures, manufacturers are faced with the cost of producing and maintaining an inventory of multiple spool valves rated for the broad range of expected supply pressure. While the availability of such options allows end users to acquire an appropriate spool valve for their desired applications, there is cost and complexity to end users in identifying and acquiring the proper spool valve for their desired applications and/or when they use a spool valve in a new and different application.

To overcome these disadvantages, the examples disclosed herein include means for generating a spool biasing force based on a biasing pressure that corresponds to the supply pressure. In this manner, as the supply pressure changes based on the particular application within which the spool valve is being implemented, the biasing pressure (and associated biasing force) changes proportionally. In this manner, manufacturers do not need to supply so many variations of a spool valve because a single spool valve constructed in accordance with the teachings disclosed herein can be used in multiple applications associated with a broad range of supply pressures. Furthermore, the example spool valves disclosed herein save end users cost in acquiring multiple spool valves and reduce the complexity and risk of error in selecting a properly rated spool valve for a particular application.

To achieve the proper balance of forces on a spool so that an increase or decrease of the input force along the operational range of the input force, for a given supply pressure, results in a desired movement of the spool along the travel span of the spool, the biasing force at the given supply pressure needs to fall within the operational range of the input force. That is, while the input force can vary between a minimum force associated with minimum input pressure (e.g., atmospheric pressure) and a maximum force associated with a maximum input pressure (e.g., the full supply pressure), the biasing force generated by the biasing pressure must fall between the minimum and maximum force.

Establishing the maximum input force to be greater than the biasing force, when both forces are based on the supply pressure, may be accomplished in different ways. In some examples, the biasing force is controlled by reducing the area upon which the biasing pressure is applied relative to the area upon which the input pressure is applied. For instance, in some disclosed examples, the biasing pressure is applied to any of a diaphragm, a piston, or a bellows that defines an area smaller than the area of the end of the spool to which the input pressure is directly applied. In other examples disclosed herein, the biasing force is controlled by reducing the biasing pressure relative to the supply pressure. For instance, in some disclosed examples, the supply pressure is passed through a first flow restrictor and partially directed out through a second flow restrictor leading to a lower pressure (e.g., the atmosphere). In such examples, the first and second flow restrictors are placed in series to define an intermediate pressure between the flow restrictors corresponding to the biasing pressure.

Figure 2:
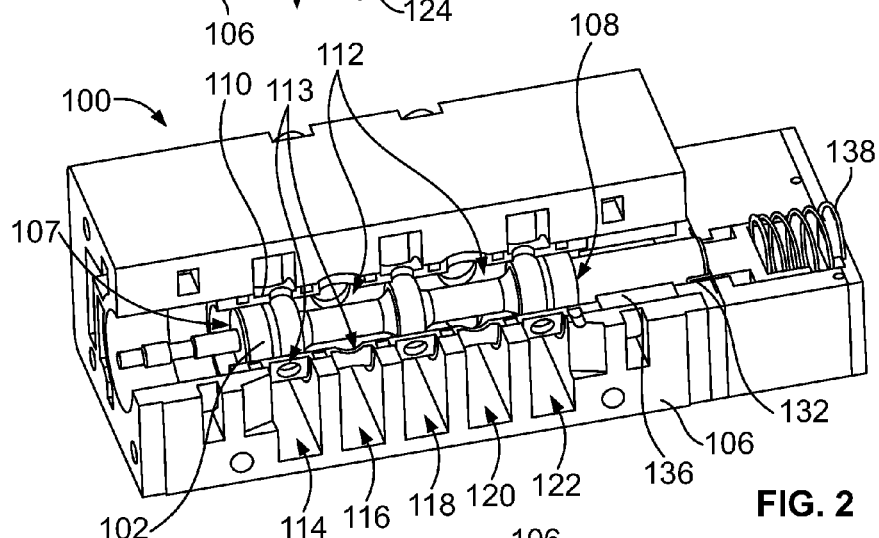
Figure 3:
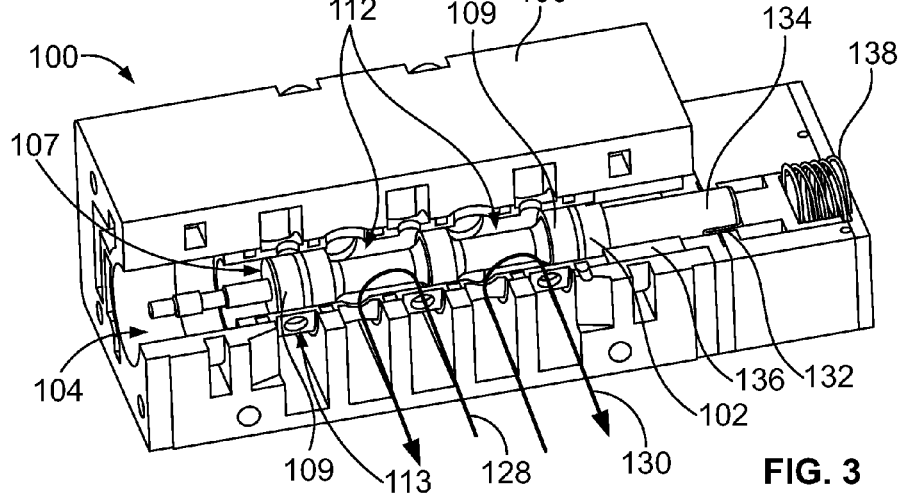

FIGS. 1-3 are cut-away perspective views of an example spool valve 100 constructed in accordance with the teachings disclosed herein. Like other spool valves, the example spool valve 100 includes a spool 102 that is selectively moveable or slideable along a channel 104 of a housing 106. In the illustrated example, the spool 102 is shown in a first position corresponding to a minimum travel position in FIG. 1, in a second position corresponding to a null position in FIG. 2, and in a third position corresponding to a maximum travel position in FIG. 3. In some examples, the spool 102 is throttled between the minimum travel position and the maximum travel position based on an input force applied to a first end 107 of the spool 102 relative to a biasing force applied opposite the input force at a second end 108 opposite the first end 107. The comparative strength of the input force to the biasing force determines whether the spool 102 moves and in which direction along its travel span.

Near the mid-point and each of the ends 107, 108 of the spool 102 are portions where the spool 102 has a diameter larger than the rest of the spool 102 (referred to herein as lands 109) and which are dimensioned to substantially sealingly engage a sleeve 110 (e.g., via a sealing ring and/or via tight tolerances) disposed within the channel 104. Between the lands 109 of the spool 102 there are portions having a smaller diameter to define channels or grooves 112 that provide a path for fluid to travel between the lands 109 inside the sleeve 110. Further, as shown in the illustrated examples, the sleeve 110 has a plurality of openings 113 in alignment with a plurality of ports 114, 116, 118, 120, 122 in the housing 106 of the example spool valve 100 such that the channel 104 (e.g., within the grooves 112 of the spool 102) is in fluid communication with the outside of the example spool valve 100. Further, in this manner, depending upon the position of the spool 102, one or more of the ports 114, 116, 118, 120, 122 may be in fluid communication to define a path of fluid to travel via one of the ports 114, 116, 118, 120, 122, through the grooves of the spool 102, and out another one of the ports 114, 116, 118, 120, 122.

For example, when the spool 102 is in the minimum travel position as illustrated in FIG. 1, the locations of the lands 109 and the grooves 112 define a first fluid path (indicated by arrow 124) between the ports 114, 116 and a second fluid path (indicated by arrow 126) between ports 118, 120. When the spool 102 is in the maximum travel position as illustrated in FIG. 3, the locations of the lands 109 and the grooves 112 define a third fluid path (indicated by arrow 128) between the ports 116, 118 and a fourth fluid path (indicated by arrow 130) between ports 120, 122. When the spool 102 is in the null position as illustrated in FIG. 2, the lands 109 cover or block the openings 113 in the sleeve 110 corresponding to the middle port 118 and the two outside ports 114, 122 such that none of the ports 114, 116, 118, 120, 122 are in fluid communication.

The arrangement in the illustrated examples of FIGS. 1-3 is suitable for controlling a double-acting control valve as shown and described in greater detail below in connection with FIG. 10. In particular, in some examples, the spool valve 100 is configured such that the middle port 118 receives a supply flow of pressurized fluid (e.g., pressurized air) such that the supply flow may be directed out either of the adjacent ports 116, 120 depending upon the position of the spool 102 so long as the spool 102 is not in the null position blocking the port 118. That is, as the spool 102 moves from the null position (FIG. 2) towards the minimum travel position (FIG. 1), the supply flow follows the second fluid path in the direction indicated by the arrow 126 resulting in an output flow at the port 120 (e.g., the output B pressure shown in FIG. 10). When the spool 102 moves from the null position (FIG. 2) toward the maximum travel position (FIG. 3), the supply flow follows the third fluid path in the direction indicated by the arrow 128 resulting in an output flow at the port 116 (e.g., the output A pressure shown in FIG. 10). In such examples, as the actuator is actuated by the output flow from the port 116, displaced fluid within the actuator is forced back through the port 120 and then exhausted through the adjacent port 122 (e.g., the exhaust B shown in FIG. 10) as the exhaust follows the fourth fluid path in the direction defined by the arrow 130. Likewise, when the output flow is from the port 120, displaced fluid within the actuator is forced back through the port 116 and then exhausted through the adjacent port 114 (e.g., the exhaust A shown in FIG. 10) as the fluid follows the first fluid path in the direction defined by the arrow 124.

As described above, in some examples, the movement of the spool 102 is controlled by an input force applied to the first end 107 of the spool 102 relative to a biasing force applied opposite the input force to the second end 108 of the spool 102. In some examples, the input force is generated from an input pressure applied to the first end 107 of the spool 102. In some examples, the input pressure is provided via a supply pressure that is separately coupled to a supply port of the spool 102 (e.g., the middle port 118 as described above). More particularly, in some examples, the input pressure corresponds to a proportional amount of the supply pressure defined by an electrical input signal generated as part of a control strategy in a process control system (e.g., a 4-20 milliamp (mA) proportional signal). That is, in some examples, the input pressure has an operational range between zero or nearly zero pressure (e.g., atmospheric pressure) and the pressure of the supply as determined from the input signal provided to a current-to-pressure (I/P) converter (e.g., the I/P converter 1008 of FIG. 10).

In many known spool valves, the biasing force to counteract the input force is provided by a control spring within the spool valve. The control spring has a predetermined initial compression to act upon the opposite end of the spool. In such known spool valves, as the input force increases (e.g., based on an increase in the input pressure) the spool moves towards the control spring, thereby compressing the spring and increasing the biasing force until the spool stops moving when the input force and the biasing force are approximately equal. As the input force decreases, the control spring pushes the spool back towards the input end of the spool. Accordingly, many known spool valves require a control spring of suitable strength based on the operational range of the input pressure. That is, if the control spring is not strong enough because of a high input pressure range (e.g., due to a high supply pressure), the force from the input pressure overcomes the control spring and prevents the control spring from proper biasing the spool. Similarly, if the control spring is too strong because of a low input pressure range, the force from the input pressure is unable to move the spool as desired. Accordingly, the ratings of the control springs used in many known spool valves are application specific in that the springs must be selected based on the supply pressure (and corresponding range for the input pressure). As a result, if end users desire to implement a spool valve in a different application with a different supply pressure, they must determine and acquire an appropriately rated spring for the new application and then disassemble and exchange the springs before using the spool valve. Alternatively, end users need to have a completely separate spool valve that can handle the pressures associated with the application of interest. Either option presents costs, complexity, and inconvenience to the implementation of such spool valves in multiple different applications.

The examples disclosed herein overcome these disadvantages of known spool valves by generating the biasing force from a biasing pressure applied to the second end 108 of the spool 102, where the biasing pressure is based on the supply pressure. In this manner, the biasing force increases or decreases proportionally to any increase or decrease in the operational range of the input force because both the input force and the biasing force are proportional to the supply pressure. As the input pressure corresponds to a proportion of the supply pressure (based on a proportional input signal), the maximum input force on the spool 102 corresponds to the input pressure equaling the supply pressure. As such, directly applying the supply pressure to the opposite end of the spool 102 (e.g., the biasing pressure is the same as the supply pressure) results in the biasing force being equivalent to the maximum input force. As a result, any lesser input force results in the biasing force overcoming the input force, thereby preventing proper control of the position and/or movement of the spool 102. Accordingly, in some examples, the spool valve 100 is constructed such that the biasing force, although based on the supply pressure, is less than the maximum input force. In some examples, establishing a biasing force that is less than the maximum input force is accomplished by using the supply pressure as the biasing pressure but reducing the area of the spool 102 on which the biasing pressure is applied. In some examples, the biasing pressure applied to the spool 102 is controlled such that it is less than supply pressure (e.g., the biasing pressure is a proportion of the supply pressure), thereby reducing the biasing force even if the area on which the biasing pressure is applied is the same as the area on which the input pressure applies on the input side of the spool 102. Additionally or alternatively, in some examples, both the biasing pressure relative to the supply pressure and the area on which the biasing pressure is applied relative to the area on which the input pressure is applied may be varied in any suitable manner to establish the desired relationship between the input force and the biasing force.

In the illustrated examples of FIGS. 1-3, the example spool valve 100 includes a diaphragm 132 with an area that is smaller than the area of the input end of the spool 102. In this manner, when the input pressure is equivalent to or approaching the full supply pressure the resulting input force will be greater than the biasing force because the input pressure will be acting on a larger area than the area of the diaphragm 132 on which the biasing pressure (i.e., the supply pressure) acts. In some examples, the diaphragm 132 is coupled to the spool 102 via a piston 134 having a cross-sectional area approximately the same as the area of the diaphragm 132. As the diameter of the piston 134 is smaller than the outer diameter of the spool 102 (corresponding to the smaller diameter of the diaphragm 132), in some examples, the spool valve 100 includes a spacer 136 to surround the piston 134 and hold the piston 134 in place.

The area of the diaphragm 132 upon which the biasing pressure is applied to generate the biasing force is based on the operational range of the input pressure as dictated by the I/P converter and the corresponding control strategy. In some examples, the diaphragm 132 has a substantially fixed area regardless of the position of the spool 102 along its travel span. In such examples, although the area is substantially constant and the applied biasing pressure is substantially constant (e.g., the supply pressure is substantially constant), the biasing force nevertheless varies across the travel span of the spool 102 because of the resilience of the diaphragm 132. In this manner, a change in the input pressure causes the spool 102 to move until equilibrium between the input force and the biasing force is achieved, thereby allowing for precise control of the position of the spool 102 similar to the control springs of known spool valves described above. Additionally or alternatively, in some examples, the spool valve 100 includes a biasing spring 138 to augment the change in the biasing force along the travel span of the spool 102 as the biasing spring 138 elongates and/or compresses. In some examples, where the biasing spring 138 is not used to counteract the input force, the biasing spring 138 is nevertheless included within the example spool valve 100 to provide a failsafe to bias the spool 102 to a failure position if the supply pressure and corresponding input pressure and biasing pressure are lost (e.g., substantially reduced or zero). In some such examples, the biasing spring 138 may have a substantially lower spring rate than control springs used in known spool valves described above because the biasing spring 138 does not have to counteract the force of the input pressure on the spool 102.

In some examples, the diaphragm 132 is omitted and the biasing pressure is applied directly to the piston 134, which defines the same fixed area, to produce the biasing force. In some such examples, the piston 134 is fabricated to fit within the spacer 136 within tight tolerances to reduce (e.g., minimize) leakage. Additionally or alternatively, in some examples, leaks are reduced via a sealing ring placed between the piston 134 and the spacer 136.

Figure 8:
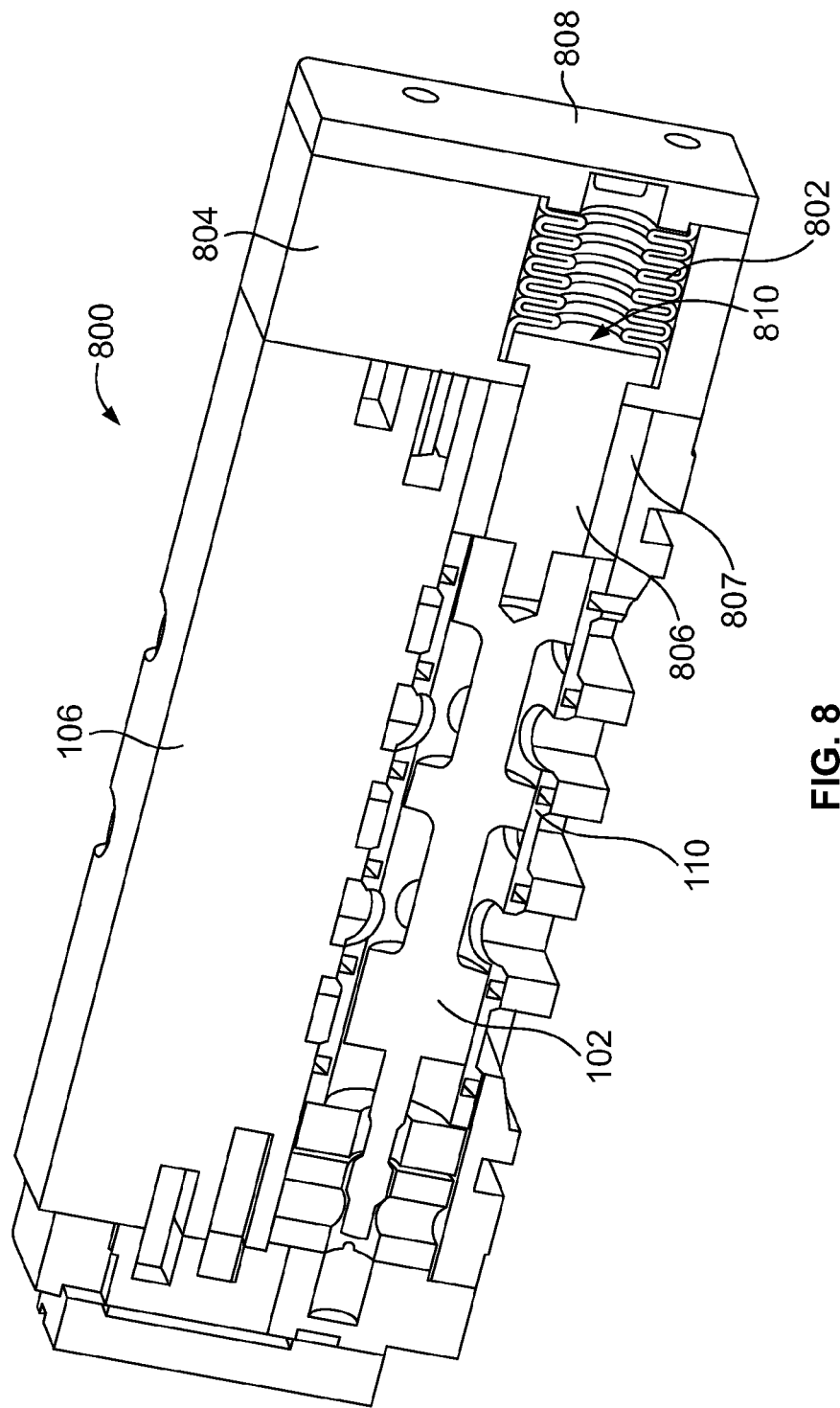
FIG. 8 is a cut-away view of another example spool valve constructed in accordance with the teachings disclosed herein.

In other examples, a bellows is used instead of a diaphragm to define a reduced area upon which the biasing pressure may be applied to generate the biasing force as shown in the example spool valve 800 of FIG. 8. The example spool valve 800 may be constructed from components of the same type of spool valve as the example spool valve 100 of FIGS. 1-3. Accordingly, the example spool valve 800 includes the spool 102, the sleeve 110, and the housing 106. However, unlike the example spool valve 100 of FIGS. 1-3, the example spool valve 800 of FIG. 8 includes a bellows 802 within a bellows housing 804. In some examples, the bellows 802 is coupled to the spool 102 via an adapter 806, which is held in alignment with the spool 102 via a spacer 807. In the illustrated example, the bellows 802 is enclosed at the opposite end by an end cap 808. As shown in the illustrated example, the bellows 802 defines a reduced area 810 upon which the biasing pressure (e.g., the supply pressure) is applied such that the resulting biasing force is less than the maximum input force based on the supply pressure applied to the opposite end of the spool 102. In some examples, the bellows 802, adapter 806, and end cap are rigidly connected. In this manner, as the spool 102 is moved within the sleeve 110, the bellows 802 will correspondingly expand or contract in the direction of the movement of the spool 102. In some examples, the bellows 802 also serves as the failsafe to urge the spool 102 toward a desired failure position if the supply pressure is lost (e.g., substantially reduced or zero).

Figure 4:
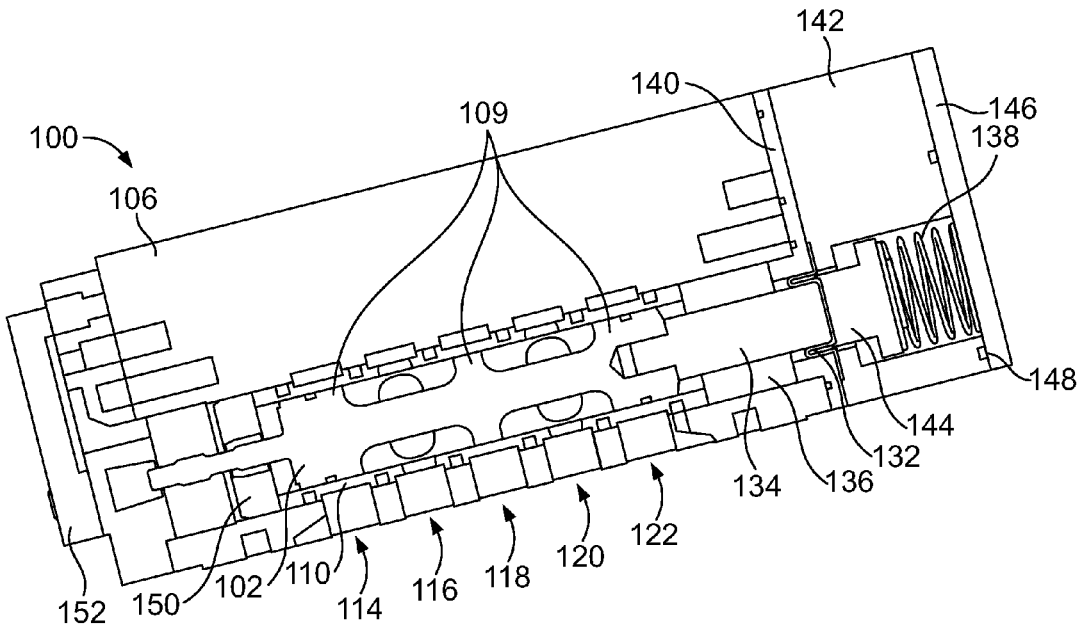
FIG. 4 is a cross-sectional view of the example spool valve of FIGS. 1-3.
Figure 5:
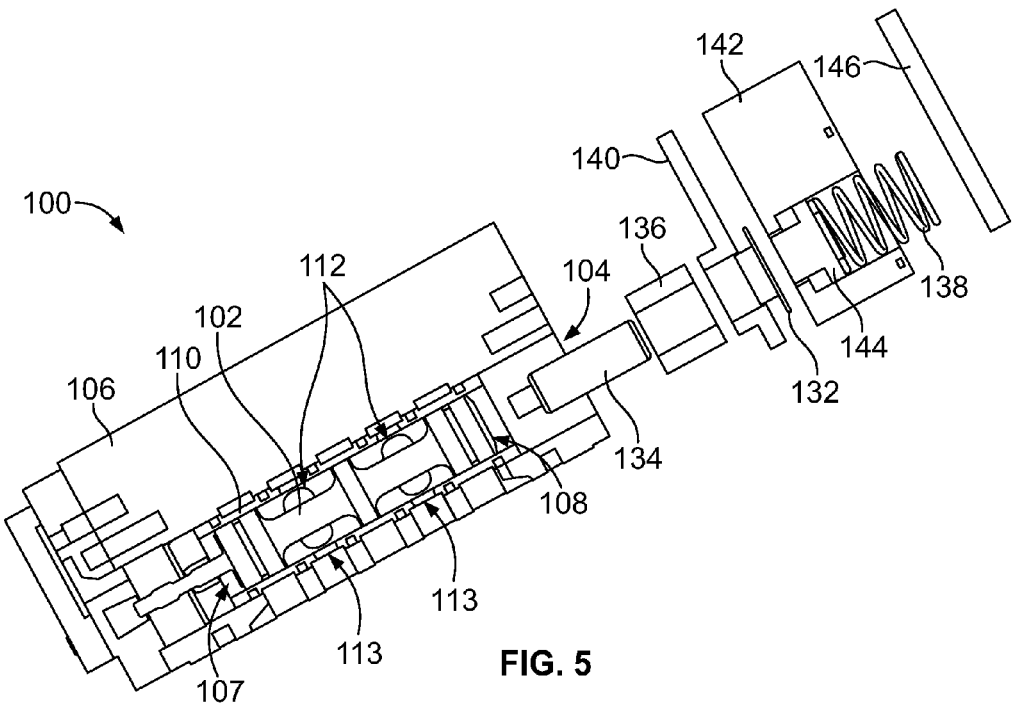
FIG. 5 is a partially cut-away exploded view of the example spool valve of FIGS. 1-4.

FIGS. 4 and 5 are respective cross-sectional and exploded views of the example spool valve 100 of FIG. 1. As shown in the illustrated example, the spool 102 is disposed within the sleeve 110. The piston 134 is surrounded by the spacer 136 and operatively couples the spool 102 to the diaphragm 132, which is held in a diaphragm housing 140. A spring barrel 142 is attached to the diaphragm housing 140 to secure a spring seat 144 for the biasing spring 138. A supply side end cap 146 compresses the spring within the spring barrel 142 to apply a predetermined amount of force to the spool 102 to bias the spool to a failsafe position if there is a failure in the supply of pressure. In some examples, the spool valve 100 is sealed via an o-ring 148 between the supply side end cap 146 and the spring barrel 142. Further, as shown in the illustrated example of FIGS. 4 and 5, at the opposite end of the example spool valve 100, the end of the spool 102 is surrounded by additional spacers 150 and enclosed by an input side end cap 152.

In some examples, the spool valves described herein are manufactured using components of an existing spool valve in combination with new components constructed in accordance with the teachings disclosed herein. In this manner, existing spool valves may be modified to implement the teachings disclosed herein. For instance, the example spool valve 100 of FIGS. 1-5 may be constructed by using some of the components of a NUMATICS® 2035 valve made by Numatics Inc., of Novi, Mich. and replacing the other components. In particular, the example spool valve 100 in the illustrated examples corresponds to a NUMATICS® 2035 valve that has been modified in that the original spring seat, control spring, and end cap have been replaced with the piston 134, the spacer 136, the diaphragm 132, the diaphragm housing 140, the spring seat 144, the biasing spring 138, the spring barrel 142, and the supply side end cap 146.

Figure 6:
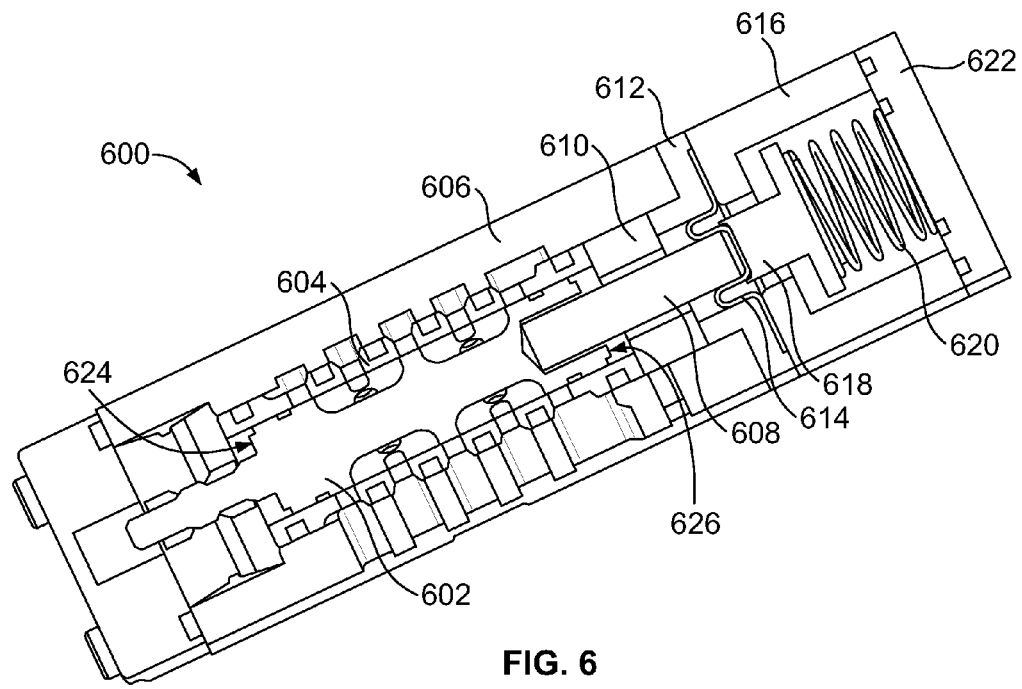
FIG. 6 is a cross-sectional view of another example spool valve constructed in accordance with the teachings disclosed herein.
Figure 7:
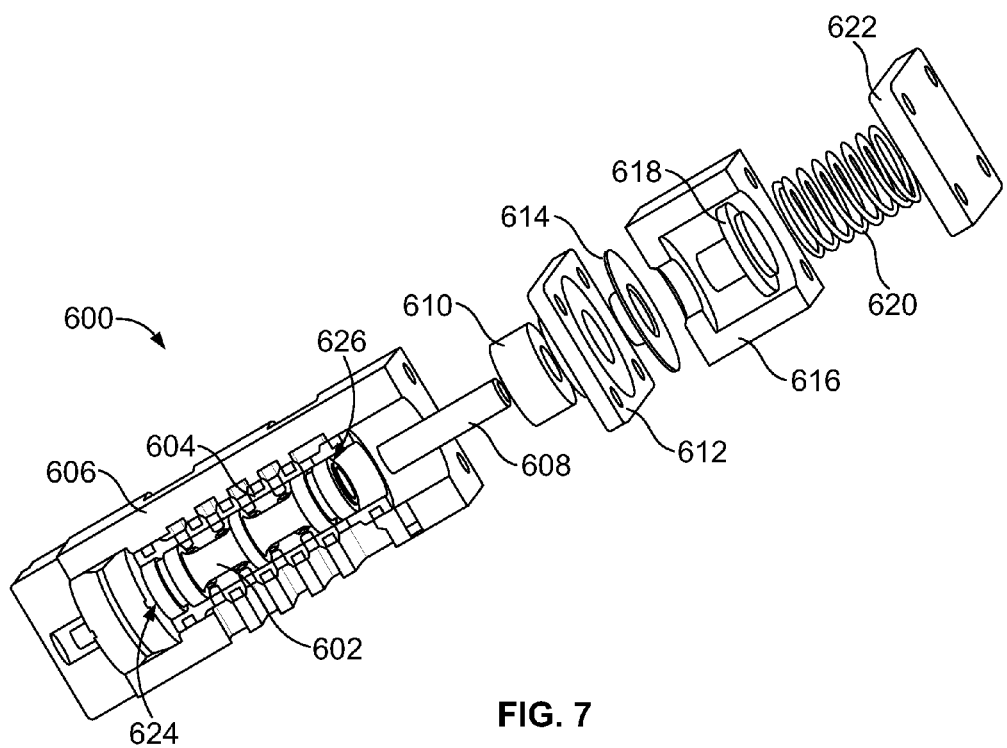
FIG. 7 is a partially cut-away exploded view of the example spool valve of FIG. 6.

FIGS. 6 and 7 are respective cross-sectional view and exploded views of another example spool valve 600 constructed in accordance with the teachings disclosed herein. The example spool valve 600 may be constructed from components of a NUMATICS® PA 15 valve made by Numatics Inc. in a manner similar to that noted above in connection with the example spool valve 100 of FIGS. 1-5. In particular, the example spool valve 600 includes a spool 602 moveable along a sleeve 604 disposed within a housing 606, all of which correspond to original components of a NUMATICS® PA 15 valve. However, the example spool valve 600 has been provided with new components constructed in accordance with the teachings disclosed herein including a piston 608, a spacer 610, a diaphragm housing 612, a diaphragm 614, a spring barrel 616, a spring seat 618, a biasing spring 620, and a supply side end cap 622. In some examples, an input pressure, which may be proportional to a supply pressure, is applied to a first end 624 of the spool 602 to generate an input force on the spool 602. Further, in some examples, a biasing pressure is applied to the diaphragm 614 to generate a biasing force on the spool 602 via the piston 608 at a second end 626 of the spool 602 opposite the first end 624. In some examples, the supply pressure serves as the biasing pressure. In such examples, the area of the diaphragm 614 is designed based on the operational range of the input force to enable control of the movement of the spool 602 within the sleeve 604 based on differences in the resulting input and biasing forces regardless of the amount of supply pressure. In this manner, the supply pressure serves as the basis for both the input pressure and the biasing pressure as described above.

Figure 9:
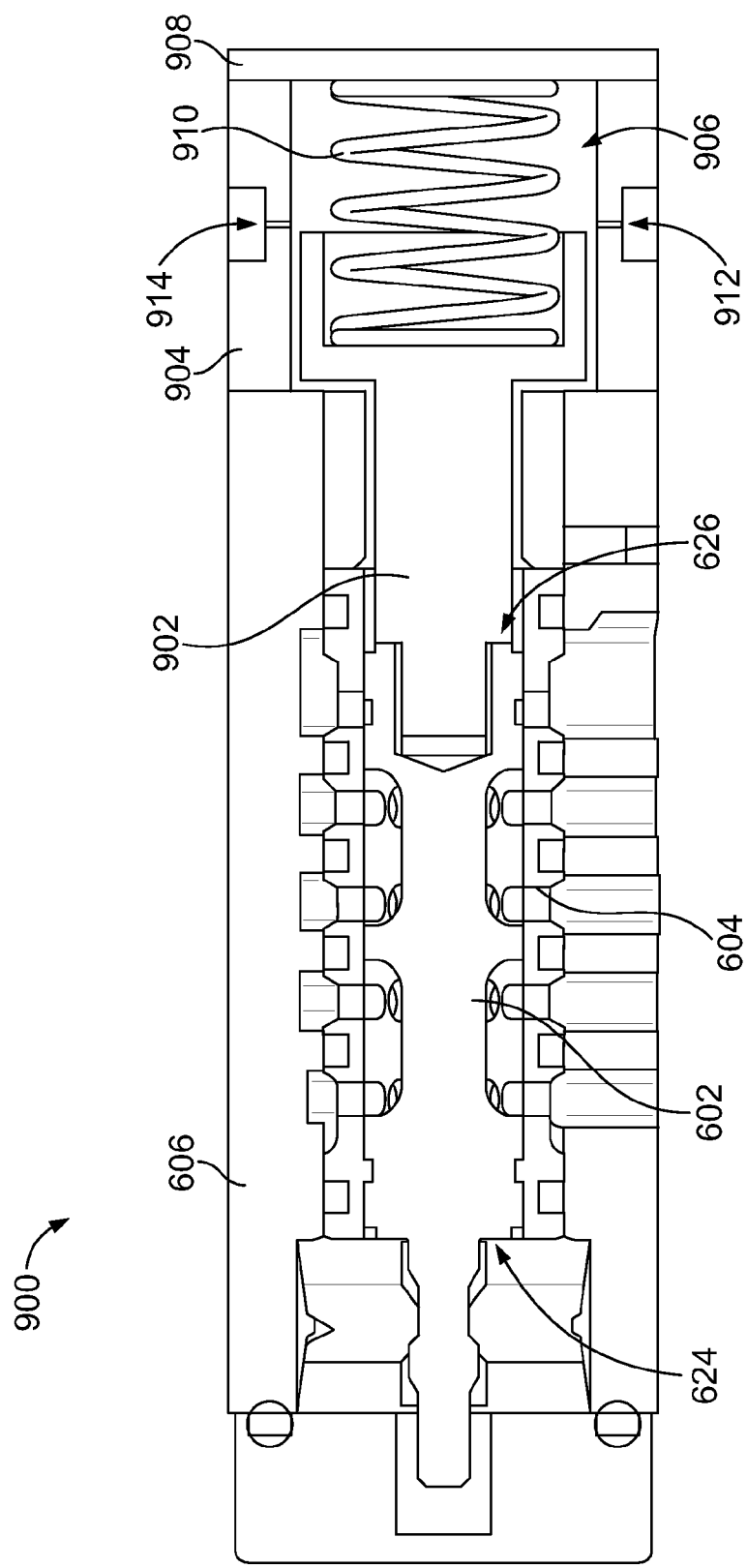
FIG. 9 is a cross-sectional view of another example spool valve constructed in accordance with the teachings disclosed herein.

FIG. 9 is a cross-sectional view of another example spool valve 900 constructed in accordance with the teachings disclosed herein. The example spool valve 900 may be constructed from components of a NUMATICS® PA 15 valve in a manner similar to that noted above in connection with the example spool valve 600 of FIGS. 6 and 7. Accordingly, the example spool valve 900 includes the spool 602, the sleeve 604, and the housing 606. However, unlike the example spool valve 600 of FIGS. 6 and 7, the example spool valve 900 of FIG. 9 includes a spring seat 902 that is coupled directly to the spool 602. In some examples, the spring seat 902 is the original spring seat manufactured with the NUMATICS® PA 15 valve on which the example spool valve 900 is based. In the illustrated example, the original components of the NUMATICS® PA 15 valve have been combined with new components constructed in accordance with the teachings disclosed herein. In particular, the example spool valve 900 includes a spring barrel 904 that defines a chamber 906 enclosed by an end cap 908. In the illustrated example, the chamber 906 houses a biasing spring 910 to act on the spring seat 902 in the same manner as described above for the biasing spring 138 of the example spool valve 100 of FIGS. 1-5.

As shown in the illustrated example of FIG. 9, the spring barrel 904 includes a first flow restrictor 912 and a second flow restrictor 914 fluidly coupled in series with the chamber 906. In some examples, the first flow restrictor 912 is coupled to the supply pressure for the spool valve 900 such that the supply pressure is in fluid communication with the chamber 906. Further, in such examples, the second flow restrictor 914 is exposed to a second pressure lower than the supply pressure such that the chamber 906 is in fluid communication with the second pressure. In some examples, when the fluid is pressurized air, the second flow restrictor leads from the chamber 906 to the atmosphere outside the spool valve 900 (i.e., the second pressure is atmospheric pressure). In this manner, as the supply fluid (e.g., air) fills the chamber 906, some of the pressure within the chamber 906 bleeds out to the atmosphere resulting in an intermediate pressure within the chamber 906 that is directly applied to the second end 626 of the spool 602 (i.e., the biasing pressure) to bias the spool 602 against the input pressure applied to the first end 624 of the spool 602. In such examples, unlike the example spool valves 100, 600, 800 of FIGS. 1-8, the area on which the biasing pressure is applied in the example spool valve 900 of FIG. 9 is not defined to be smaller than the area on which the input pressure is applied to lower the resulting biasing force relative to the maximum input force. Rather, the example spool valve 900 is configured such that the intermediate or biasing pressure is between the atmospheric pressure and the supply pressure. That is, in the illustrated example of FIG. 9, the full supply pressure is not applied to spool 602 but an intermediate pressure (e.g., the biasing pressure) is applied as a result of the constant bleeding of pressure out to the atmosphere via the second flow restrictor 914. In some examples, the precise dimensions of the first and second flow restrictors 912, 914 are based on the operational range of the input pressure such that the resulting input force and biasing force (based on the intermediate pressure) enable control of the spool 602 along its travel span. Accordingly, in some examples, the intermediate pressure will increase or decrease proportionally with any increase or decrease in the supply pressure resulting in a corresponding increase or decrease in the biasing force to counteract the input pressure in a similar manner to the reduced area on which the biasing pressure acts in the example spool valves 100, 600, 800 of FIGS. 1-8 described above.

As described above, in some examples, the biasing spring 910 serves as a failsafe to bias the spool 602 to a desired failure position if the supply pressure (and corresponding input pressure and biasing pressure) is lost (e.g., substantially reduced or zero). Additionally or alternatively, in some examples, the biasing spring 910 also serves to partially bias the spool 602 along with the biasing force from the biasing pressure to create a variation in the bias force corresponding to the position of the spool 602 (e.g., based on the elongation and/or compression of the biasing spring 910).

Although the example spool valves 100, 600, 800, 900 have been described in detail above, the teachings disclosed herein are also applicable to other spool valves. For example, other spool valves having more or fewer ports defining more, fewer, and/or different fluid communication paths between the ports can be modified in accordance with the teachings disclosed herein to bias the corresponding spool based on a supply pressure. In some such examples, the resulting biasing force may be defined by designing an appropriate area (e.g., corresponding to the area of a diaphragm, piston, or bellows) on which the supply pressure is applied. In other examples, a biasing pressure corresponding to a proportion of the supply pressure is applied to the spool to achieve the desired biasing force. Additionally or alternatively, in some examples both the biasing pressure and the area on which the pressure is applied can be specifically designed in accordance with the teachings disclosed herein to establish the proper relationship between the input force and the resulting biasing force that applies over a broad range of potential supply pressures because both the input pressure and biasing pressure are based on the supply pressure. Further, although the example spool valves 100, 600, 800, 900 described above are pneumatic spool valves, the teachings disclosed herein may also be suitably adapted to hydraulic spool valves. Additionally, the example spool valves 100, 600, 800, 900 disclosed herein, as well as other spool valves constructed in accordance with the teachings disclosed herein, may be implemented in any suitable application for such spool valves. For instance, as mentioned above, the example spool valves 100, 600, 800, 900 may be used to control the position of a control valve as shown and described more fully in FIG. 10. Furthermore, the teachings disclosed herein can also be used to bias a spool valve based on supply pressure when the input force is not based on the supply pressure (e.g., solenoid actuated spool valves, manually actuated spool valves, etc.)

Figure 10:
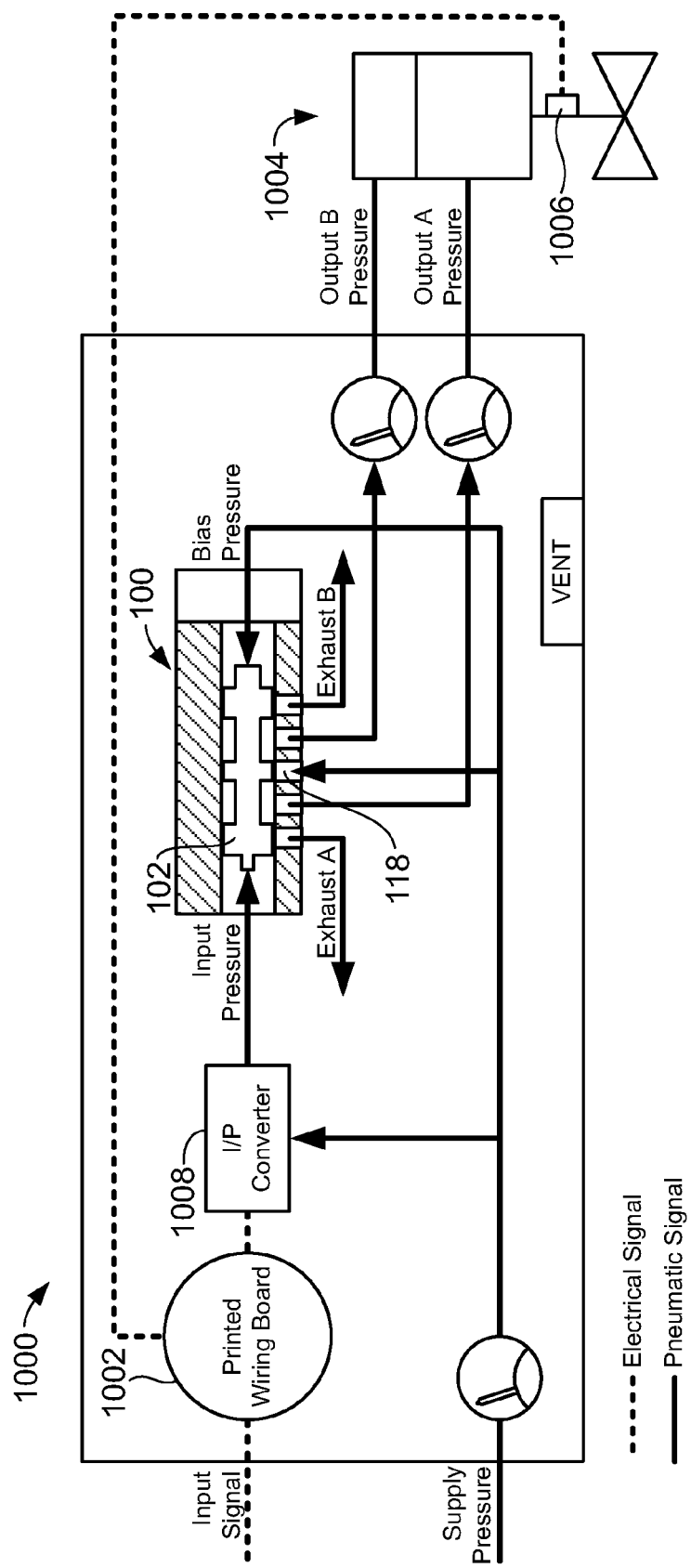
FIG. 10 is a schematic drawing of an example digital valve controller that includes the example spool valve of FIGS. 1-5.

FIG. 10 is a schematic drawing of an example digital valve controller (DVC) 1000 that includes the example spool valve 100 of FIGS. 1-5. The example DVC 1000, as with other known DVCs, includes a printed wiring board 1002 configured to control a double-acting control valve 1004 based on an electrical input signal (e.g., from a control room of a process control system) and feedback from a position sensor 1006 associated with the control valve 1004. In the illustrated example, the DVC 1000 receives a supply pressure that is directed through a current-to-pressure (I/P) converter 1008 to provide an input pressure proportional to a drive signal generated by the printed wiring board 1002 based on the input signal and the position feedback.

In many known DVCs, the input pressure is provided to an internal relay that uses the input pressure to form a proportional pressure (or flow) via one of two outputs (e.g., output A and output B) that are coupled to the control valve 1004 to precisely control movement of the valve. However, such known DVCs are limited because the internal relay cannot handle high flow rates (e.g., high supply pressures). As a result, such DVCs are limited to controlling actuators with smaller volumes and/or moving control valves at slower speeds. To overcome these disadvantages, some known DVCs are coupled to a pneumatic volume booster to achieve higher pressures/flow rates. However, such a solution is expensive as it requires the additional component of the pneumatic booster and the resulting expense of maintaining additional components. Furthermore, volume boosters can be difficult to adjust or change (e.g., when using the DVC in a different application).

In accordance with the teachings disclosed herein, the example DVC 1000 includes the spool valve 100 instead of an internal relay because spool valves can handle significantly higher pressure ranges than known relays. The other spool valves 600, 900 described herein or another spool valve constructed in accordance with the teachings disclosed herein could alternatively be used in place of the spool valve 100. As shown in the illustrated example, the supply pressure is directed to the input side of the example spool valve 100 (e.g., via the I/P converter 1008), to the supply port of the spool valve 100 (e.g., the middle port 118), and to the supply side of the example spool valve 100. In this manner, the input pressure, which is based on the supply pressure on the input side of the example spool valve 100, generates an input force on the spool 102 that is counteracted by a biasing force on the spool 102. The biasing force is generated by the biasing pressure, which is also based on the supply pressure but on the supply side of the example spool valve 100. As both the input pressure and the biasing pressure are based on the supply pressure, the resulting input force and biasing force are proportional to each other. In this manner, the example DVC 1000 can handle a broad range of supply pressures (e.g., between 20-150 psi) without an operator or other personnel having to adjust a pneumatic volume booster (if a relay is used) and/or keep track of or interchange multiple control springs (if a known spool valve is used) when the supply pressure is changed. In such examples, the relationship of the biasing force to the operational range of the input force is controlled by designing the size of the area on which the biasing force is applied (e.g., when the biasing pressure is the same as the supply pressure) to be smaller than the area on which the input pressure applies and/or by designing the spool valve 100 to control the biasing pressure to be lower than the supply pressure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a housing of a spool valve, the housing including a first port to receive a fluid at a supply pressure;
   a spool within the housing, a position of the spool to be selectively controlled via an input force acting on a first end of the spool, the position of the spool to define a path of a flow of the fluid through the spool valve from the first port to a second port of the housing, wherein a biasing force, acting on a second end of the spool, is to bias the spool opposite the input force, the biasing force to be generated from the supply pressure applied to the second end of the spool, the input force to be generated from an input pressure applied to the first end of the spool, the input pressure corresponding to a proportion of the supply pressure, the proportion to be less than the supply pressure;
   a current-to-pressure converter to define the proportion of the supply pressure corresponding to the input pressure based on an electrical control signal; and
   fluid lines to separately guide the fluid (1) indirectly to the first end of the spool via the current-to-pressure converter, (2) directly to the second end of the spool to continuously provide the biasing force when the fluid at the supply pressure is supplied, and (3) directly to the first port of the housing of the spool valve.

2. The apparatus of claim 1, further comprising a piston coupled to the second end of the spool, the biasing force to bias the spool via the piston.

3. The apparatus of claim 1, further comprising a bellows coupled to the second end of the spool, the biasing force to bias the spool via the bellows.

4. The apparatus of claim 1, further comprising a diaphragm coupled to the second end of the spool, the biasing force to bias the spool via the diaphragm.

5. The apparatus of claim 1, further comprising a spring to bias the spool to a failure position if the supply pressure is substantially reduced or zero.

6. The apparatus of claim 1, wherein the input pressure is to be applied to a first area adjacent the first end of the spool and the supply pressure is to be applied to a second area adjacent the second end of the spool, the second area smaller than the first area.

7. The apparatus of claim 6, wherein the second area is defined by one of a bellows, a piston, or a diaphragm.

8. The apparatus of claim 1, further comprising first and second flow restrictors fluidly coupled in series via a chamber defined by the housing, the supply pressure to enter the chamber via the first flow restrictor, a portion of the supply pressure to escape the chamber via the second flow restrictor to define an intermediate pressure within the chamber, the biasing force to be generated by the intermediate pressure applied to the second end of the spool.

9. The apparatus of claim 1, wherein the proportion of the supply pressure is greater than atmospheric pressure.

10. An apparatus comprising:
    a spool within a spool valve to control a flow of fluid at a supply pressure through the spool valve as the spool is moved via an input force that varies in magnitude, the spool valve to define a chamber adjacent an end of the spool, wherein a biasing force is to bias the spool opposite the input force, the biasing force to be generated from a biasing pressure of the fluid within the chamber, the biasing pressure to be based on the fluid at the supply pressure being guided directly to the chamber from a supply of the fluid independent of the flow of the fluid through the spool valve, the biasing force to be applied continuously during operation of the spool valve, the spool to move to a minimum travel position by a first magnitude of the input force, an intermediate travel position by a second magnitude of the input force, and a maximum travel position by a third magnitude of the input force.

11. The apparatus of claim 10, further comprising:
    a first flow restrictor to provide fluid communication between the chamber and the fluid at the supply pressure; and
    a second flow restrictor to provide fluid communication between the chamber and a second pressure lower than the supply pressure, the first and second flow restrictors disposed in series on the spool valve with the chamber disposed therebetween, wherein the first and second flow restrictors define the biasing pressure within the chamber, the biasing pressure to be between the second pressure and the supply pressure.

12. The apparatus of claim 10, wherein the input force is generated from an input pressure applied to a second end of the spool, the input pressure to be a proportion of the supply pressure ranging from a minimum pressure to a maximum pressure corresponding to the supply pressure.

13. The apparatus of claim 12, wherein the biasing force is less than the third magnitude of the input force corresponding to when the input pressure is at the maximum pressure.

14. The apparatus of claim 12, further comprising a current-to-pressure converter of a digital valve controller to define the proportion of the supply pressure based on an electrical control signal.

15. The apparatus of claim 10, further comprising a digital valve controller, wherein the spool valve is to be housed in the digital valve controller.

16. The apparatus of claim 10, wherein the supply pressure is to be applied to a first area within the chamber adjacent the end of the spool, the input force to be generated from an input pressure applied to a second area adjacent an opposite end of the spool, the input pressure corresponding to a proportion of the supply pressure, the first area smaller than the second area.

17. An apparatus comprising:
    a spool within a spool valve, the spool to be selectively moveable within the spool valve via an input force to control a flow of a supply fluid between ports in the spool valve, the supply fluid having a supply pressure; and
    means for generating a biasing force to bias the spool opposite the input force, the biasing force corresponding to a biasing pressure applied to an end of the spool, the biasing pressure to be based on the supply pressure of the supply fluid, a chamber adjacent the end of the spool to be in direct fluid communication with a source of the supply fluid so that the biasing force is constantly applied to the end of the spool when the supply fluid is being supplied, the input force generated by a range of different input pressures corresponding to different proportions of the supply pressure, the range of different input pressures including a first input pressure, a second input pressure greater than the first input pressure, and a third input pressure greater than the second input pressure.

18. The apparatus of claim 17, wherein the means for generating the biasing force includes means for reducing a first area on which the biasing pressure is applied relative to a second area on which the range of different input pressures is applied.

19. The apparatus of claim 17, wherein the means for generating the biasing force includes means for reducing the biasing pressure relative to the supply pressure.

20. The apparatus of claim 16, wherein a change in the supply pressure is to result in a proportional change in the biasing force.

* * * * *